Nov. 20, 1923.                                                                    1,475,053
                              T. W. COOPER
        AXLE BOX AND BEARING FOR TRAMCAR AND LIKE VEHICLE WHEELS
                            Filed Feb. 6, 1922
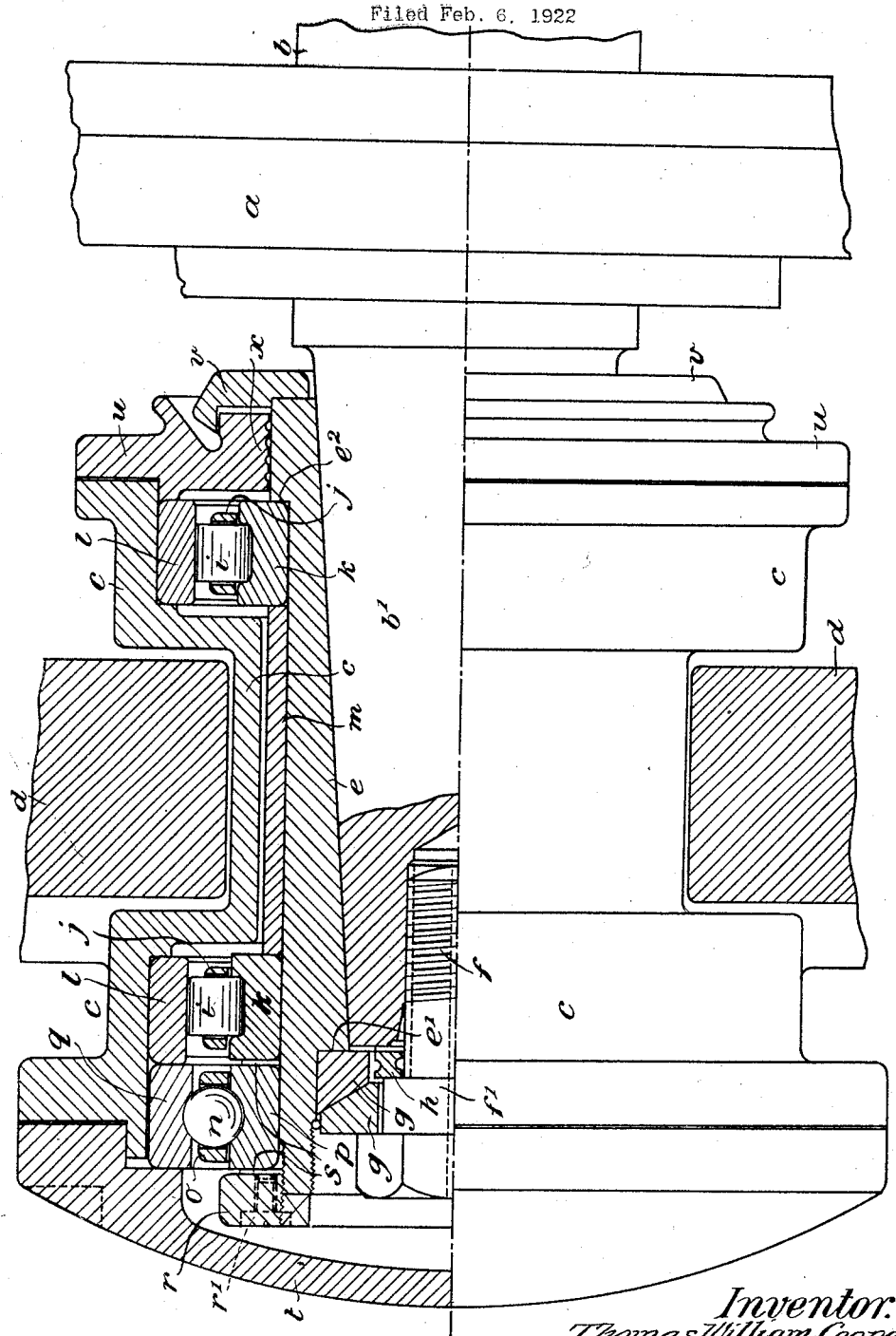
Inventor.
Thomas William Cooper
By James L. Norris,
   Attorney Patented Nov. 20, 1923.

1,475,053

UNITED STATES PATENT OFFICE.

THOMAS WILLIAM COOPER, OF CHELMSFORD, ENGLAND, ASSIGNOR TO THE NORMA COMPANY OF AMERICA, OF LONG ISLAND CITY, NEW YORK, A CORPORATION OF NEW YORK.

AXLE BOX AND BEARING FOR TRAMCAR AND LIKE VEHICLE WHEELS.

Application filed February 6, 1922. Serial No. 534,512.

*To all whom it may concern:*

Be it known that I, THOMAS WILLIAM COOPER, a subject of the King of Great Britain, residing in Chelmsford, England, have invented certain new and useful Improvements Relating to Axle Boxes and Bearings for Tramcar and like Vehicle Wheels, of which the following is a specification.

The invention consists in an improved manner of supporting axle boxes and bearings of tram car and like vehicle wheels on the wheel axles.

According to the invention an axle box housing is supported on the wheel axle by means of two sets of roller bearings, the rollers being arranged in races that encircle a cylindrical sleeve having a tapered bore that fits around the terminal portion of the axle which is correspondingly tapered and projects beyond or overhangs the outer face of the wheel. The axle box is located endwise of the axle by means of a single circular row of balls carried in races that also encircle the sleeve.

One method of carrying this invention into effect is shown in the accompanying drawings, but it is obvious that other designs of axle and axle box can be used without in any way departing from the invention.

The invention will be further described with reference to the accompanying drawing which is a part plan and part horizontal section of an axle box that is supported on the terminal portion of an axle in the improved manner, the axle box being shown arranged, as is customary, between the jaws of a frame or horn plate.

In the drawing, $a$ denotes a part of wheel of a tramcar or like vehicle, and $b$ is the axle, the terminal portion $b'$ of which projects outwardly beyond the face of the wheel and is tapered. The axle box housing is indicated by the reference letter $c$ and traverses the space between the two limbs $d$ of the horn plate which would be carried by the vehicle frame, which is not shown. The cylindrical sleeve, with tapered bore, is shown at $e$ and is shown retained on the tapered axle $b'$ by means of a stud or bolt $f$ that is screwed into an axially disposed threaded recess provided in the end of the shaft.

The head of the stud $f$ is made to bear against a pair of bevelled washers $g$ which in turn abut against an internal shoulder $e'$ formed on the sleeve. The stud may be provided with a collar or flange $f'$ which is adapted to bear against a spring washer $h$, interposed between it and the end face of the axle.

The axle box $c$ is supported on the sleeve by two sets of roller bearings, which are of known construction and comprise each a number of rollers $i$ which are fitted in cages $j$ to retain them in proper relative positions, and are disposed between an inner race $k$ and an outer race $l$, which races may consist of hard steel rings and are arranged to have a tight fit against the outer face of sleeve $e$, and the inner surface of the housing $c$ respectively.

One set of the roller bearings is placed on the inner side of the horn plate and the outer set on the other side. Between the two inner races $k$ and embracing the sleeve $e$ is a distance bushing $m$. The inner race $k$ nearer the wheel $a$ bears against a shoulder $e^2$ formed on the outside of the sleeve, the other inner race $k$ and the outer race $l$, associated with it bear against a locating ball bearing, which comprises a number of balls $n$ arranged to constitute a circular row. The balls $n$, like rollers $i$, are fitted to cages $o$ and mounted between an inner race $p$ and an outer race $q$.

The inner race of the locating ball bearing and the inner races $k$ of the roller bearings are retained in place by means of an annular shaped nut $r$ which can be locked in position by one or more set screws $r'$. Shims or packings $s$ may be interposed as required between the meeting faces of the inner race $p$, the inner race $k$, and the nut $r$, for the purpose of adjusting the axial position of the axle box in relation to the axle.

The outer race $q$ of the location bearing is allowed free radial movement in the axle box housing $c$ but is clamped axially together with the outer race $l$ of the roller bearing into the housing $c$ by means of the end cover $t$ which in turn is bolted to the housing $c$ by bolts (not shown) in the usual way and forming a complete end seal.

The outer race $l$ of the roller bearing nearer the wheel is clamped in position by means of the end cap $u$. This end cap $u$ together with the flange $v$ mounted on the end of the sleeve *e*, are so formed as to prevent water and dirt from entering the axle box. The end cap *u* at its inner diameter is also widened out and provided with small grooves *x* so that a grease seal is provided between it and an adjacent portion of the sleeve *e*.

Having thus described the nature of the said invention and the best means I know of carrying the same into practical effect, I claim:—

1. In an axle box and bearings for a tram car or like vehicle-wheel axle, the combination with the axle box housing of an axle having a tapered portion projecting beyond the face of the wheel, a cylindrical sleeve having an external shoulder and a tapered bore fitting around said tapered portion of the axle, means for fixing said sleeve to said axle, means for supporting the axle box housing on the axle comprising an inner set and an outer set of roller bearings operatively disposed between the sleeve and the said housing, each of said sets of bearings comprising an annular inner race bearing against the outer face of the sleeve, an annular outer race fitting tightly against the inner face of the housing, the inner race of the inner bearing being in abutment with the shoulder on the sleeve, and a number of rollers disposed between the races, a distance bushing embracing the sleeve and interposed between the two inner races, means for locating said housing endwise of the axle comprising a ball bearing including an inner race, an outer race, and a number of balls disposed between said two latter races, the said locating bearing arranged to bear against said outer set of roller bearings, and means for retaining said ball bearing in operative position.

2. In an axle box and bearings according to claim 1, means for adjusting the axial position of the axle box in relation to the axle, substantially as described.

In testimony whereof I have signed my name to this specification.

THOMAS WILLIAM COOPER.